(12) United States Patent
Putzig

(10) Patent No.: US 7,138,356 B2
(45) Date of Patent: Nov. 21, 2006

(54) ALKOXYLATED PHOSPHITE ESTER AND PROCESS THEREFOR

(75) Inventor: Donald Edward Putzig, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 335 days.

(21) Appl. No.: 10/810,404

(22) Filed: Mar. 26, 2004

(65) Prior Publication Data

US 2005/0215809 A1  Sep. 29, 2005

(51) Int. Cl.
*B01J 31/00* (2006.01)
(52) U.S. Cl. .................. 502/162; 502/208; 558/70
(58) Field of Classification Search ............... 502/162, 502/208; 558/70
See application file for complete search history.

(56) References Cited

U.S. PATENT DOCUMENTS

| 2,437,046 A | 3/1948 | Rothrock et al. |
| 3,328,493 A | 6/1967 | Larrison |
| 4,031,165 A | 6/1977 | Saiki et al. |
| 4,101,526 A | 7/1978 | Buxbaum |
| 4,115,371 A | 9/1978 | Bier et al. |
| 4,208,527 A | 6/1980 | Horlbeck et al. |
| 4,328,059 A | 5/1982 | Horlbeck et al. |
| 4,329,444 A | 5/1982 | Borman |
| 4,506,091 A | 3/1985 | Deardorff |
| 5,453,479 A | 9/1995 | Borman et al. |
| 6,066,714 A | 5/2000 | Putzig et al. |
| 6,663,961 B1 | 12/2003 | Fujimori |
| 2002/0086970 A1 | 7/2002 | Cho |

FOREIGN PATENT DOCUMENTS

| DE | 101 21 542 A1 | 2/2003 |
| GB | 942 776 A | 11/1963 |
| GB | 1 118 876 A | 7/1988 |
| RO | 66 262 A | 11/1997 |

*Primary Examiner*—Kamal A. Saeed
*Assistant Examiner*—Robert Shiao

(57) ABSTRACT

A composition and a process for producing the composition are disclosed. The composition comprises an alkoxylated phosphite ester which has the formula of $(HO[\{CH(R)\}_m O]_n)_3 P$ in which each R can be the same or different and can be independently hydrogen or an alkyl group, or combinations of two or more thereof and m is a number from 2 to about 20 and n is a number from 2 to about 20. The process comprises contacting a trialkyl phosphite with an alkylene glycol or polyalkylene glycol to produce a mixture followed by heating the mixture. Also disclosed in a process for using the composition, which comprises contacting a carbonyl compound, in the presence of the composition, with an alcohol.

11 Claims, No Drawings

ALKOXYLATED PHOSPHITE ESTER AND PROCESS THEREFOR

FIELD OF INVENTION

This invention relates to a composition comprising an alkoxylated phosphite ester, to a process for producing the ester, and to a process for using the composition.

BACKGROUND OF THE INVENTION

Polyesters such as, for example, polyethylene terephthalate, polytrimethylene terephthalate and polybutylene terephthalate, are a class of important industrial polymers. They are widely used in thermoplastic fibers, films, and molding applications.

Polyesters can be produced by transesterification of a dialkyl terephthalate ester with a glycol followed by polycondensation or by direct esterification of terephthalic acid with the selected glycol followed by polycondensation.

Organic titanates, such as tetraisopropyl and tetra n-butyl titanates, are known to be effective catalysts for producing polyester and frequently are the catalyst of choice. However, these catalysts tend to generate a significant amount of yellow discoloration when used as polyesterification catalysts.

Therefore, there is an increasing need for developing a new composition that can be used as stabilizer for polyester and to reduce color formation of polyester.

SUMMARY OF THE INVENTION

A composition comprises an alkoxylated phosphite ester (or polyalkylene glycol phosphite ester) which has the formula of $(HO[\{CH(R)\}_mO]_n)_3P$ in which each R can be the same or different and can be independently hydrogen, an alkyl group, or combinations thereof, m is a number from 2 to about 20, n is a number from 1 to about 20.

A process comprises contacting a phosphite ester with a glycol or polyalkylene glycol under a condition effective to produce an alkoxylated phosphite ester.

A process, which can be used for producing polyester, comprises contacting a carbonyl compound, in the presence of the composition, with an alcohol to produce polyester.

Also provided is a process, which can be used for producing polyester. It comprises contacting a carbonyl compound, optionally in the presence of a catalyst, with an alcohol to produce a product comprising an oligomer and contacting the product with an alkoxylated phosphite ester in which the catalyst can be any esterification or transesterification or polycondensation catalyst.

DETAILED DESCRIPTION OF THE INVENTION

The composition of this invention can be substantially or completely soluble or a stable solution in a solvent such as, for example, water, an alcohol, or combinations thereof. The term "substantially" means more than trivial. However, a substantial portion of the composition can also be suspended or dispersed in the solvent. The term "stable solution" means a solution remains solution without substantial precipitation or suspension or dispersion of a solute at room temperature (about 25° C.) for at least about 1 day, or 5 days, or even 10 days.

The composition is, or can comprise or consist essentially of or consist of an alkoxylated phosphite ester which has the formula of $(HO[\{CH(R)\}_mO]_n)_3P$ in which each R can be the same or different and can be independently hydrogen, an alkyl group having 1 to 10 carbon atoms per group, or combinations thereof, m is a number from 2 to about 20 or 2 to 10, n is a number from 1 to about 20 or 1 to about 10.

Examples of alkoxylated phosphite esters include, but are not limited to, tri-(ethylene glycol) phosphite, tri-(propylene glycol) phosphite, tri(isopropylene glycol) phosphite, tri-(butylene glycol) phosphite, tri-(isobutylene glycol) phosphite, tri-(pentylene glycol) phosphite, tri-(hexylene glycol) phosphite, tri-(nonylene glycol) phosphite, tri-(diethylene glycol) phosphite, tri-(triethylene glycol) phosphite, tri-(polyethylene glycol) phosphite, tri-(polypropylene glycol) phosphite, tri-(polybutylene glycol) phosphite or combinations of two or more thereof.

The composition can be produced by contacting a trialkylphosphite with an alkylene glycol or polyalkylene glycol under a condition effective to produce a product comprising an alkoxylated phosphite.

A trialkylphosphite having the formula of $(R'O)_3P$ where R' is an alkyl group which can be substituted with a second alkyl group or aryl group. Examples of trialkylphosphites include, but are not limited to, trimethyl phosphite, triethyl phosphite, tripropyl phosphite, tributyl phosphite, triisobutyl phosphite, triamyl phosphite, trihexyl phosphite, trinonyl phosphite, or combinations of two or more thereof.

A glycol or polyalkylene glycol can have the formula $HO[\{CH(R)\}_mO]_nH$ in which R, m, and n are the same as those disclosed above (if a polyalkylene glycol, m and n are each at least 2). Examples of alkylene glycols include, but are not limited to, ethylene glycol, propylene glycol, isopropylene glycol, 1,4-butylene glycol, 1,5-pentylene glycol, 1,6-hexylene glycol, 1,8-ocytlene glycol, 1,9-nonylene glycol, or combinations of two or more thereof. Examples of polyalkylene glycols include, but are not limited to, diethylene glycol, triethylene glycol, polyethylene glycol, polypropylene glycol, polybutylene glycol, or combinations of two or more thereof.

The condition can include a temperature in the range of from about 30° C. to about 250° C., or about 50° C. to about 200° C., or about 75° C. to about 150° C. under a pressure that can accommodate the temperature for a period of time from about 0.01 to about 10, or 0.1 to about 5, or 0.1 to about 3 hours. Contacting under such condition produces a product comprising an alkoxylated phosphite.

The process can be carried out in the presence of a catalyst in an amount from about 0.0001 to about 5 weight % of trialkylphosphite. The catalyst can be any known catalyst for catalyzing the reaction of a phosphite and glycol. An example of catalyst is a tetraalkyl titanate, also referred to as titanium tetrahydrocarbyloxide. Examples of suitable tetraalkyl titanates include those having the general formula $Ti(OR)_4$ where each R is individually selected from an alkyl, cycloalkyl, alkaryl, hydrocarbyl radical containing from 1 to about 30, preferably 2 to about 18, and most preferably 2 to 12 carbon atoms per radical and each R can be the same or different. Tetraalkyl titanates in which the hydrocarboxyl group contains from 2 to about 12 carbon atoms per radical which is a linear or branched alkyl radical are relatively inexpensive, readily available, and effective in forming a solution. Suitable tetraalkyl titanates include, but are not limited to, titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof.

Suitable tetraalkyl titanates can be produced by any means known to one skilled in the art such as, for example, disclosed in U.S. Pat. No. 6,066,714, the entire disclosure of which is herein incorporated by references. Examples of commercially available tetraalkyl titanates include, but are not limited to, TYZOR® TPT and TYZOR® TBT (tetra isopropyl titanate and tetra n-butyl titanate, respectively) available from E. I. du Pont de Nemours and Company, Wilmington, Del., USA (DuPont).

Thereafter, the product comprising the alkoxylated phosphite can be further process by any means known to one skilled in the art to purify, or to recover, or to isolate the alkoxylated phosphite. The means include any known distillation techniques known to one skilled in the art such as, for example, a distillation under reduced pressure (vacuum distillation). The distillation can be carried out under a condition including a temperature in the range of from about 0° C. to about 250° C., or about 30° C. to about 200° C., or about 50° C. to about 150° C. under a pressure that can accommodate the temperature for a period of time from about 0.01 to about 10, or 0.1 to about 5, or 0.1 to about 3 hours.

The composition comprising the alkoxylated phosphite can also comprise or be produced from titanium or a titanium compound such as, for example, an organic titanium compound. An example of organic titanium compound can be tetraalkyl titanate as disclosed above.

A tetraalkyl titanate can also be combined with a zirconium compound to produce a mixture comprising a tetraalkyl titanate and a zirconium tetrahydrocarbyloxide. Examples of zirconium compounds include, but are not limited to, zirconium tetraethoxide, zirconium tetrapropoxide, zirconium tetraisopropoxide, zirconium tetra-n-butoxide, zirconium tetrahexoxide, zirconium tetra 2-ethylhexoxide, zirconium tetraoctoxide, and combinations of two or more thereof. The molar ratio of Ti/Zr can be in the range of from about 0.001:1 to about 10:1.

The composition can further comprise a complexing agent can be one or more hydroxycarboxylic acids, alkanolamines, and aminocarboxylic acids. For example, a complexing agent can be an α-hydroxycarboxylic acid, alkanolamine, or α-aminocarboxylic acid in which the hydrocarbyl group or alkyl group has 1 to about 15, preferably 1 to 10 carbon atoms per group, and combinations of two or more thereof. Examples of suitable complexing agents include, but are not limited to, lactic acid, glycolic acid, citric acid, tartaric acid, malic acid, diethanolamine, triethanolamine, tetrahydroxyisopropylethylenediamine, glycine, bis-hydroxyethyl glycine, hydroxyethyl glycine, and combinations of two or more thereof.

The titanium compound can also be a titanium chelate, which comprises or is produced from a tetraalkyl titanate and a complexing agent, both as disclosed above. A titanium chelate can be produced by any methods well known to one skilled in the art or is commercially available. Example of commercially available titanium chelate include those available from DuPont such as, for example, TYZOR®LA (titanium bis-ammonium lactate), TYZOR®AA (bis-acetylacetonate titanate), TYZOR®DC (bis-ethyl acetoacetate titanate), TYZOR®TE (bis-triethanolamine titanate), or combinations of two or more thereof.

The composition can further comprise a hypophosphorous acid or its salt, which has the formula of $H_2POM$ in which M is hydrogen, ammonium ion, a metal ion, or combinations of two or more thereof and the phosphorus atom is bonded to two hydrogen atoms. The metal ion can be any metal ion such as an alkali metal ion. The hypophosphorous acid or its metal salt such as sodium hypophosphite can be commercially available as an aqueous solution.

Examples of solvent is water or an alcohol having the formula of $R^1(OH)_p$, an alkylene glycol that can include those disclosed above, a polyalkylene glycol or alkoxylated alcohol having the formula of $R^1O[CH_2CH(R^1)O]_pH$, or combinations of two or more thereof in which each $R^1$ can be the same or different and is a hydrocarbyl radical having 1 to about 10 carbon atoms per radical; $R^1$ can be an alkyl radical; A can be an alkylene radical having 2 to about 10 carbon atoms per molecule; and each p can be the same or different and is independently a number in the range of from 1 about to about 10. Examples of solvents include, but are not limited to, water, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof.

Alternatively, the solvent can be that which is formed on reaction of the tetraalkyltitanate with the complexing agent such as, for example, isopropyl alcohol from tetraisopropyltitanate or n-butyl alcohol from tetra n-butyltitanate.

The molar ratio of the complexing agent to tetraalkyl titanate can be any effective ratio that can substantially prevent the precipitation of the titanium compound in the presence of a solvent. Generally, the ratio can be in the range of from about 1:1 to about 10:1, or about 1:1 to about 7:1, or 1:1 to 4:1. The molar ratio of hypophosphorous acid or its salt to titanium compound (P:Ti) can be any ratio that, when the composition is used as catalyst to produce a polyester, can reduce the yellowness of the polyester such as, for example, in the range of from about 0.1:1 to about 10:1, or about 0.5:1 to about 7:1, or 1:1 to 4:1. The molar ratio of tris-phosphite or diphosphonite ester to titanium compound (P:Ti) can be any ratio that, when the composition is used as catalyst to produce a polyester, can reduce the yellowness of the polyester such as, for example, in the range of from about 0.1:1 to about 50:1, or about 0.5:1 to about 20:1, or 1:1 to 10:1.

The composition can further comprise a co-catalyst such as aluminum, cobalt, zirconium (as disclosed above), zinc, or a compound comprising one or more of these metals, and combinations of two or more thereof. For example, zinc acetate, zinc chloride, zinc nitrate, zinc sulfate, aluminum chloride, aluminum hydroxide, aluminum acetate, aluminum hydroxychloride, cobaltous acetate tetrahydrate, cobaltous nitrate, cobaltous chloride, cobalt acetylacetonate, cobalt napthenate, cobalt hydroxide, cobalt salicyl salicylate, and combinations of two or more thereof can be uses as co-catalyst.

The catalyst composition can be produced by any means known to one skilled in the art such as, for example, that disclosed in U.S. Pat. No. 6,066,714 disclosed above.

A process that can be used in, for example, the production of an ester or polyester is provided. The process comprises contacting, in the presence of a catalyst, a carbonyl compound with an alcohol. The catalyst can comprise or be produced from titanium or a titanium compound and an alkoxylated phosphite disclosed above.

Any carbonyl compound, which when combined with an alcohol, can produce an ester or polyester can be used. Generally, such carbonyl compounds include, but are not limited to, acids, esters, amides, acid anhydrides, acid halides, salts of carboxylic acid oligomers or polymers having repeat units derived from an acid, or combinations of two or more thereof. An example of acid is an organic acid such as a carboxylic acid or salt or ester thereof.

A preferred process for producing an ester or polyester comprises, consists essentially of, or consists of contacting a reaction medium with a composition disclosed above in the first embodiment of the invention. The reaction medium can comprise, consist essentially of, or consist of an alcohol and either (1) an organic acid, a salt thereof, an ester thereof, or combinations thereof or (2) an oligomer having repeat units derived from an organic acid or ester.

The organic acid or ester thereof can have the formula of $R^2COOR^2$ in which each $R^2$ independently can be (1) hydrogen, (2) hydrocarboxyl radical having a carboxylic acid group at the terminus, or (3) hydrocarbyl radical in which each radical has 1 to about 30, carbon atoms per radical which can be alkyl, alkenyl, aryl, alkaryl, aralkyl radical, or combinations of two or more thereof, or (4) combinations of two or more thereof. For example, an organic acid can have the formula of $HO_2CA^1CO_2H$ in which $A^1$ is an alkylene group, an arylene group, alkenylene group, or combinations of two or more thereof. Each $A^1$ has about 2 to about 30, or about 3 to about 25, or about 4 to about 20, or 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, and combinations of two or more thereof. Examples of suitable esters include, but are not limited to, dimethyl adipate, dimethyl phthalate, dimethyl terephthalate, methyl benzoate, dimethyl glutarate, and combinations of two or more thereof.

Examples of carboxylic acid metal salts or esters thereof includes a 5-sulfo isophthalate metal salt and its ester having the formula of $(R^3O_2C)_2ArS(O)_2OM^1$ in which each $R^3$ can be the same or different and is hydrogen or an alkyl group containing 1 to about 6, or 2, carbon atoms. Ar is a phenylene group. $M^1$ can be an alkali metal ion such as sodium. An example of the ester is bis-glycolate ester of 5-sulfo isophthalate sodium salt.

Any alcohol that can esterify an acid to produce an ester or polyester can be used in the present invention. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof.

When the carbonyl compound includes a 5-sulfo isophthalate metal salt or its ester as disclosed above, the alcohol can be ethylene glycol, propylene glycol, isopropylene glycol, butylene glycol, 1-methyl propylene glycol, pentylene glycol, diethylene glycol, triethylene glycol, 1,6-hexylene glycol, cyclohexyl-1,4-bismethanol, and combinations of two or more thereof. The contacting of a 5-sulfo-isophthalate metal salt or its ester with a glycol produces a bis-glycolate ester of 5-sulfo isophthalate metal salt.

The contacting of the carbonyl compound and alcohol can be carried out by any suitable means. For example, the carbonyl compound and alcohol can be combined before being contacted with the catalyst. For example, the catalyst can be dispersed in an alcohol by any suitable means such as mechanical mixing or stirring to produce a dispersion followed by combining the dispersion with (1) a carbonyl compound and (2) an alcohol under a condition sufficient to effect the production of a ester or polyester.

An oligomer can have a total of about 1 to about 100, or about 2 to about 10 repeat units derived from a carbonyl compound and alcohol.

Any suitable condition to effect the production of an ester or polyester can include a temperature in the range of from about 150° C. to about 500° C., preferably about 200° C. to about 400° C., and most preferably 250° C. to 300° C. under a pressure in the range of from about 0.001 to about 1 atmosphere for a time period of from about 0.2 to about 20, preferably about 0.3 to about 15, and most preferably 0.5 to 10 hours.

The molar ratio of the alcohol to carbonyl compound can be any ratio so long as the ratio can effect the production of an ester or polyester. Generally the ratio can be in the range of from about 1:1 to about 10:1, or about 1:1 to about 5:1, or 1:1 to 4:1.

The catalyst, expressed as Ti, can be present in the range of about 0.0001 to about 50,000, or about 0.001 to about 10,000, or 0.001 to 1000 ppmw, parts per million by weight (ppmw) of the medium comprising carbonyl compound and alcohol,. The co-catalyst disclosed above, if used, can also be present in the same range (expressed as Zr, Zn, Al, or Co). Other ingredients such as conventional esterification and transesterification catalysts (e.g., manganese) and those enhancing catalyst stability or performance may be introduced to the production process concurrent with, or following, introduction of the composition disclosed herein.

Also disclosed is a process that can be used to reduce the formation of color of polyester. The process can comprise contacting a carbonyl compound, optionally in the presence of a catalyst, with an alcohol to produce an oligomer and contacting the oligomer with an alkoxylated phosphite ester. The carbonyl compound, alcohol, oligomer, and an alkoxylated phosphite ester can be the same as those disclose above. Any catalysts known to catalyze esterification or transesterification or polycondensation can be used in the process. Examples of such catalyst include antimony, manganese, cobalt, titanium, zirconium, zinc, aluminum or combinations thereof. Generally, an alkoxylated phosphite ester can be introduced to a polyester process after an oligomer is produced such as during polycondensation stage. Because the production of oligomer and polyester process are well known to one skilled in the art, the description of which is omitted herein for the interest of brevity.

The following Examples are provided to further illustrate the present invention and are not to be construed as to unduly limit the scope of the invention. All TYZOR® products were obtained from DuPont disclosed above.

EXAMPLES

Example 1

Tri-(ethylene glycol) phosphite solution (TEGP) was produced by adding 25 g of tributyl phosphite to 225 g of ethylene glycol to produce a mixture. Tyzor® TPT (1 g) was added as catalyst and the mixture was heated to 115° C. and held for 1 hour. A 30 mm Hg (4 kPa) vacuum was applied and 22.7 g of n-butanol was removed by vacuum distillation. The resultant solution contained about 9.4% tri-(ethylene glycol) phosphite and about 1.36% phosphorous (P). The TEGP solution thus prepared was used to produce catalysts 2 and 3 shown in Table 1.

TABLE 1[1]

| Catalyst No. | Catalyst Composition | Metals or Elements (Weight Ratio) |
|---|---|---|
| 1 | 56.7% Sb glycolate (.2028), 23.7% Co acetate (.0886), and 10% $H_3PO_4$ (.301) | Sb/Co/P (230/42/19) |

TABLE 1-continued

| Catalyst No. | Catalyst Composition | Metals or Elements (Weight Ratio) |
|---|---|---|
| 2 | TYZOR ® LA (.061), Zn acetate (.1334) in 5 g water, Co acetate (.1055) in 5 g water, 10% H$_3$PO$_4$ (.412), and example 1 (1.5 g) | Ti/Zn/Co/P/TEGP-P (10/80/50/26/25) |
| 3 | TYZOR ® LA (.061), Zn acetate (.1334) in 5 g water, Co acetate (.1055) in 5 g water, 10% H$_3$PO$_4$ (.412), and example 1(1 g) | Ti/Zn/Co/TEGP-P (10/80/50/26/25) |
| 4 | TYZOR ® LA (.061), Zn acetate (.1334) in 5 g water, Co acetate (.1165) in 5 g water, and10% H$_3$PO$_4$(.413) | Ti/Zn/Co/P (10/80/55/26) |

[1]TYZOR ® LA is titanium bis-ammonium lactate; TEGP-P is ppm P in TEGP

Example 2

The catalyst solutions prepared in Example 1 were used in a 1-liter resin kettle provided with a Jiffy Mixer agitator rotating at 40 rpm, a thermocouple, condenser and nitrogen sweep. The catalyst, 115 g ethylene glycol, and 400 g terephthalic acid oligomer (TPA oligomer, produced by the process disclosed in U.S. Pat. No. 6,066,714, column 8, line 5–22, the disclosure of the US patent is incorporated herein by reference). The agitator was turned on and the temperature increased to 275° C. over a period of about 2.5 hours. The contents were polymerized by holding under agitation at 275° C. and a pressure of 120 mm Hg (16 kPa) for 20 minutes, and at 280° C. and a pressure of 30 mm Hg (4 kPa) for an additional 20 minutes. The contents were then held under agitation at 285° C. at 1 to 2 mm Hg (0.27 kPa) pressure for a time sufficient to reach 15 ounce-inch (0.106 Newton-meter) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results comparing the color as measured spectrophotometrically are given in Table 2 below.

Color of the resulting polymer was measured in terms of the L-value and b-value, and a-value using an instrument such as SP-78 Spectrophotometer. The L-value shows brightness, with the greater the numerical value showing higher (desirable) brightness. A value of 78 or more would be considered good. The b-value shows the degree of yellowness, with a higher numerical value showing a higher (undesirable) degree of yellowness. Generally a b value below 7 can be considered good. The a-value represents degree of redness, a higher positive a-value is redder, lower negative is greener.

Table 2 shows that polyester product produced using the phosphite stabilizer (using catalysts 2 and 3) had consistently lower b-value than those using phosphoric acid (catalysts 1 and 4) as color stabilizer.

TABLE 2

| Catalyst No. | Polycondensation Time (min) | L-Value | a-Value | b-Value |
|---|---|---|---|---|
| 1 | 75 | 73.79 | −1.74 | 5.03 |
| 2 | 135 | 81.63 | −0.89 | 1.87 |
| 3 | 60 | 79.21 | −1.31 | 2.16 |
| 4 | 35 | 76.48 | −1.1 | 6.53 |

What is claimed is:

1. A composition comprising an alkoxylated phosphite having the formula of $(HO[\{CH(R)\}_m O]_n)_3 P$ wherein each R is independently hydrogen, an alkyl group, or combinations of two or more thereof, m is a number from 2 to about 20; and n is a number from about 1 to about 20; and an organic titanium compound.

2. A composition according to claim 1 wherein said alkoxylated phosohite is tri-(ethylene glycol) phosphite, tri(propylene glycol) phosphite; tri(isopropylene glycol) phosphite; tri(1,4-butylene glycol) phosphite; tri(-isobutylene glycol) phosphite; tri(pentylene glycol) phosphite; tri (hexylene glycol) phosphite; tri(octylene glycol) phosphite, tri(nonylene glycol) phosphite, tri(diethylene glycol) phosphite, tri(triethylene glycol) phosphite, tri(polyethylene glycol)phosphite, tri(polypropylene glycol) phosphite, tri(polybutylene glycol) phosphite; or combinations of two or more thereof.

3. A composition according to claim 2 wherein said alkoxylated phosphite is tri-(ethylene glycol) phosphite.

4. A composition according to claim 2 wherein said composition further comprises a complexing agent, which is a hydroxycarboxylic acid, an alkanolamine, an aminocarboxylic acid, or combinations of two or more thereof.

5. A composition according to claim 4 wherein said composition further comprises a hypophosphorous acid, its salt, or both.

6. A composition according to claim 4 wherein said titanium compound is tetra isopropyl titanate, tetra n-butyl titanate, or combinations thereof.

7. A composition according to claim 5 wherein said titanium compound is tetra isopropyl titanate, tetra n-butyl titanate, or combinations thereof.

8. A composition according to claim 4 wherein said titanium compound is a titanium chelate comprising or produced from a tetraalkyl titanate and said complexing agent.

9. A composition according to claim 8 wherein said composition further comprises sodium hypophosphite.

10. A composition according to claim 8 wherein said titanium compound is titanium bis-ammonium lactate.

11. A composition according to claim 10 wherein said alkoxylated phosphite is tri-(ethylene glycol) phosphite.

* * * * *